US009759317B2

(12) United States Patent
Stammen

(10) Patent No.: US 9,759,317 B2
(45) Date of Patent: Sep. 12, 2017

(54) CLOSED HYDRAULIC CIRCUIT

(71) Applicant: Fluitronics GMBH, Krefeld (DE)

(72) Inventor: Christian Stammen, Bochum (DE)

(73) Assignee: Fluitronics GMBH, Krefeld (DE)

( * ) Notice: Subject to any disclaimer, the term of this patent is extended or adjusted under 35 U.S.C. 154(b) by 300 days.

(21) Appl. No.: 14/390,132

(22) PCT Filed: Apr. 4, 2013

(86) PCT No.: PCT/DE2013/100123
§ 371 (c)(1),
(2) Date: Oct. 2, 2014

(87) PCT Pub. No.: WO2013/149618
PCT Pub. Date: Oct. 10, 2013

(65) Prior Publication Data
US 2015/0075150 A1 Mar. 19, 2015

(30) Foreign Application Priority Data

Apr. 5, 2012 (DE) .................. 10 2012 102 978

(51) Int. Cl.
*F16D 31/02* (2006.01)
*F16H 61/4104* (2010.01)
(Continued)

(52) U.S. Cl.
CPC ......... *F16H 61/4104* (2013.01); *F15B 7/006* (2013.01); *F15B 7/008* (2013.01);
(Continued)

(58) Field of Classification Search
CPC . F15B 21/042; F16H 61/4139; F16H 61/4104
(Continued)

(56) References Cited

U.S. PATENT DOCUMENTS

| 6,263,670 | B1 | 7/2001 | Gluck et al. | |
| 7,234,298 | B2 * | 6/2007 | Brinkman | E02F 9/2217 |
| | | | | 60/414 |
| 2004/0187491 | A1 * | 9/2004 | Whitaker | F04B 1/145 |
| | | | | 60/476 |

FOREIGN PATENT DOCUMENTS

| CN | 1664384 A | 9/2005 |
| CN | 101845837 A | 9/2010 |

(Continued)

OTHER PUBLICATIONS

Office Action dated Jan. 29, 2013, in German Application No. 10 2012 102 978.4, issued by the German Patent Office, five pages.
(Continued)

*Primary Examiner* — Michael Leslie
*Assistant Examiner* — Daniel Collins
(74) *Attorney, Agent, or Firm* — Finnegan, Henderson, Farabow, Garrett & Dunner LLP

(57) ABSTRACT

The present invention relates to a closed hydraulic circuit between a hydraulic pump and a hydraulic motor that are connected to one another via working lines, a flushing pump being provided in order to feed a pressure medium into the working lines, and an output connection being provided in order to discharge excess pressure medium from the working lines. At least one hydraulic consumer, which is provided to convert at least some of the volume flow discharged from the hydraulic circuit into mechanical power, is connected downstream of the output connection.

6 Claims, 3 Drawing Sheets

(51) Int. Cl.
　　　*F15B 7/00*　　　　(2006.01)
　　　*F15B 21/04*　　　 (2006.01)
　　　*F15B 21/14*　　　 (2006.01)
　　　*F16H 61/4157*　　(2010.01)
　　　*F16H 61/448*　　　(2010.01)
　　　*F16H 61/00*　　　 (2006.01)

(52) U.S. Cl.
　　　CPC ............ *F15B 21/042* (2013.01); *F15B 21/14* (2013.01); *F16H 61/4157* (2013.01); *F16H 61/448* (2013.01); *F15B 2211/20546* (2013.01); *F15B 2211/20561* (2013.01); *F15B 2211/20584* (2013.01); *F15B 2211/27* (2013.01); *F15B 2211/50527* (2013.01); *F15B 2211/611* (2013.01); *F15B 2211/613* (2013.01); *F15B 2211/88* (2013.01); *F16H 2061/0015* (2013.01)

(58) Field of Classification Search
　　　USPC .................................................. 60/398, 414
　　　See application file for complete search history.

(56) References Cited

FOREIGN PATENT DOCUMENTS

| | | |
|---|---|---|
| CN | 201818591 U | 5/2011 |
| DE | 10 2006 062 836 B3 | 12/2008 |
| DE | 10 2009 011 247 A1 | 9/2010 |
| DE | 10 2010 006 464 A1 | 8/2011 |
| DE | 10 2007 046 696 A1 | 10/2011 |
| DE | 10 2010 014 071 A1 | 10/2011 |
| EP | 2 341 190 A1 | 7/2011 |

OTHER PUBLICATIONS

Office Action dated Sep. 18, 2015, in Chinese Application No. 200510049370.5, issued by The State Intellectual Property Office of The People's Republic of China, six pages.

International Search Report of PCT/DE2013/100123, dated Jul. 22, 2013 (4 pages).

\* cited by examiner

CLOSED HYDRAULIC CIRCUIT

This is a U.S. National Phase of PCT/DE2013/100123, filed Apr. 4, 2013, which claims the benefit of priority to DE 10 2012 102 978.4, filed Apr. 5, 2012, which is incorporated herein by reference.

The invention relates to a closed hydraulic circuit according to the features of claim 1.

Very great power is transmitted with small volumes of pressure medium in a closed hydraulic circuit. The losses arising therefrom heat up the pressure medium considerably. Therefore, it is necessary to keep the operating temperature of the circulating pressure medium within a desired range by additional measures. Furthermore, leakage losses occur in the hydraulic pumps and hydraulic motors used in a closed hydraulic circuit and also in other hydraulic components and these losses have to be compensated.

The prior art is what is referred to as a flushing of the closed hydraulic circuit by an additional pump (flushing pump). The flushing pump conveys pressure medium into the low-pressure side of the hydraulic circuit. The flushing pump can compensate for the leakage losses. When the pressure level of the low-pressure side is chosen appropriately, it is possible to simultaneously use the flushing pump to supply the hydraulic plant with control oil.

The pressure medium is cooled via the arrangement of a cooler in the flow of pressure medium, preferably in a low pressure region, for example downstream of a flushing valve, through which the pressure medium introduced into the hydraulic circuit is discharged again. Alternatively, the pressure medium can be cooled in the tank by a secondary circuit.

The flushing valve connects the low-pressure side with a discharge of the pressure medium out of the circuit. If the low-pressure side is fixed for a specific drive task, the flushing valve can be omitted and the outlet connection can be connected to the low-pressure side. In this case, the pressure medium which is conducted away is conveyed to the tank via a pressure valve, for example via a pressure-limiting valve. The pressure limiting means adjusts the pressure level in the low-pressure side. However, with an alternating association, i.e. when the high-pressure side and low-pressure side alternate, a flushing valve is essential.

In closed circuits which contain differential cylinders as consumers (sometimes called "semi-open circuits"), the volume flows resulting from the difference in surface area must also be compensated by the flushing pump or by the discharge.

Conventional volume flows for the cooling and flushing operations are in the region of 10% to 20% of the circulating pressure medium flow. In semi-open circuits, they are also substantially determined by the surface area ratio of the differential cylinders. Usual pressures in the low-pressure side of closed hydraulic circuits are 20 bar to 30 bar. In the case of volume flows of 30 l to 60 l per minute, the hydraulic power required for flushing is 1 kW to 3 kW. This power is also converted into heat and must also be considered when configuring the cooling means. The further losses in the flushing pump must also be taken into account.

This means that a power, higher by the reciprocal value of the pump efficiency, is taken by the drive motor of the closed hydraulic circuit, which power, however, is not available for the output, i.e. for the operation of the hydraulic pump in the closed hydraulic circuit.

DE 10 2010 006 464 A1 is a prior art document and discloses a closed hydraulic circuit between a hydraulic pump and a hydraulic motor which are interconnected by working lines. A flushing pump is provided to feed pressure medium into the working lines. An outlet connection is also provided to discharge excess pressure medium from the working lines. At least one hydraulic consumer is connected downstream of the outlet connection, which consumer is provided to convert at least some of the volume flow discharged from the hydraulic circuit into mechanical power. A closed hydraulic circuit of this type is also disclosed in EP 2 341 190 A1.

The object of the invention is to provide a closed hydraulic circuit in which the proportion of the losses can be reduced.

This object is achieved by a closed hydraulic circuit having the features of claim 1.

Advantageous developments of the invention are the subject of the dependent claims.

The closed hydraulic circuit provides a hydraulic pump and a hydraulic motor which are interconnected by working lines. Pressure medium is fed into the working lines by an additionally provided flushing pump. Furthermore, an output connection is provided to discharge excess pressure medium from the working lines.

The hydraulic pump and the hydraulic motor can operate in a reversible manner, i.e. they can release and consume driving power. For example, during braking a negative load may be produced no that the hydraulic motor works as a pump and the hydraulic pump is driven thereby. In the context of the invention, a hydraulic pump thus denotes the preferred operating state of this hydraulic unit, namely the pump operation, while a hydraulic motor is primarily driven. However, the invention does not exclude negative loads, resulting during braking, in the region of the drive. The hydraulic motor can save energy by using the braking energy. The saved or additionally recovered energy can be made available to further consumers.

The particular feature of the closed hydraulic circuit according to the invention is that connected downstream of the output connection for the flow of flushing oil is at least one hydraulic consumer which is provided to convert at least some of the volume flow, discharged from the hydraulic circuit, into mechanical power. The hydraulic consumer is a hydraulic motor which drives further components directly or indirectly, i.e. directly or with the interconnection of a transmission, i.e. it converts the hydraulic power into mechanical power. Particularly preferably, the mechanical power is returned to the drive shaft of the flushing pump. Of course, the mechanical power can also be used to drive auxiliary units.

In the invention, the flushing flow is used to recover energy so that with the same power of the hydraulic motor in the hydraulic circuit, the driving power for the hydraulic pump can be reduced. If the drive for the hydraulic pump is an internal combustion engine, then this means that the fuel consumption of the internal combustion engine can be reduced. The costs of a hydraulic consumer in the form of a hydraulic motor are relatively low, whereas the costs of fossil fuels are relatively high. The closed hydraulic circuit designed according to the invention makes it possible to recover the additional costs of the hydraulic consumer within a very short time. This particularly applies to closed hydraulic circuits in mobile applications which have a high performance, and applies especially to hydrostatic drives for mobile machines, in particular for diggers.

The hydraulic consumer can be a gear motor in particular. If other auxiliary units are to be driven as the hydraulic consumer, they should not be process-critical auxiliary units which have to be continuously fed with hydraulic oil.

Instead, auxiliary motors, fan pumps and units which only have to be driven intermittently can be driven by the discharged volume flow, i.e. units in which a non-uniform speed or a short-term stoppage is not critical to the system.

An energy storage device which releases the hydraulic fluid again at a later time and thereby reintroduces energy into a circuit is also understood in the widest sense as an auxiliary unit.

In the context of the invention, a plurality of hydraulic consumers can be provided. These can be different types of consumers having different power stages.

The use of hydraulic motors allows both the use of hydraulic motors with a fixed displacement, i.e. hydraulic motors in which a constant volume flow is required per revolution, and also allows the use of hydraulic motors with an adjustable displacement. The latter are preferably operated in pressure control.

In an advantageous development, a pressure-limiting valve is provided in addition to the at least one hydraulic consumer to prevent pressure peaks in the low-pressure side of the hydraulic circuit. The pressure-limiting valve is connected parallel to the hydraulic consumer.

In addition, the hydraulic consumer can be connected via a pressure valve which is connected upstream. The pressure valve is a pressure sequence valve. Said valve acts to ensure that a minimum pressure is present on the inlet side before opening. The pressure which prevails on the low-pressure side of the hydraulic circuit is present on the inlet side. To ensure that the pressure medium always flows to the hydraulic consumer, a lower pressure must be set at the pressure sequence valve than at the pressure-limiting valve which is also connected to the outlet of the flushing valve.

Depending on the type of use of the mechanical power, it can be advantageous to fit the hydraulic consumer with a suction valve which is connected to a tank or to a return line of an open circuit which may be present. If not enough volume flow is available to supply the hydraulic consumer, a trouble-free operation is still possible due to the suction valve, even if there is no recovery of energy in this case. Consequently, a configuration can be provided such that in a few operating states or when there are extreme operating parameters, energy is deliberately not recovered to allow an even greater recovery of energy in other frequent operating states. This configuration is also advantageous for use in semi-open circuits.

In the following, the invention be described on the basis of embodiments illustrated in the drawings, in which.

Figure 1:
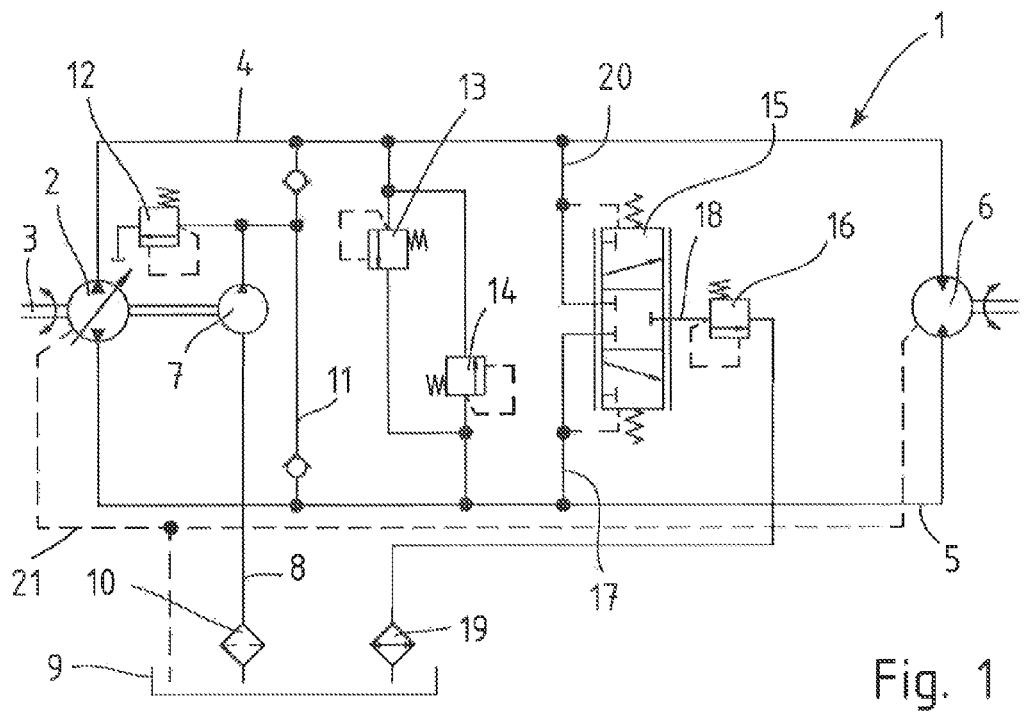
FIG. 1 shows the prior art in a closed hydraulic circuit.

FIG. 1 shows a closed hydraulic circuit 1 comprising an adjustable hydraulic pump 2 for conveying a pressure medium. The hydraulic pump 2 is driven by a drive shaft 3. The drive (not shown) of the drive shaft 3 is, for example, an internal combustion engine, in particular a diesel engine. The hydraulic pump 2 is connected to a hydraulic motor 6 in the closed circuit via a first working line 4 and a second working line 5. Both the hydraulic pump 2 and the hydraulic motor 6 are reversible in the illustrated embodiment.

A flushing pump 7, in addition to the hydraulic pump 2, is connected to the drive shaft 3. The flushing pump 7 is used to feed a pressure medium into the closed hydraulic circuit 1.

The flushing pump 7 suctions pressure medium via a suction line 8 out of a tank 9 via a filter 10. The pressure medium is had via a feed line 11 into one of the working lines 4, 5, depending on the pressure conditions. A pressure-limiting valve 12 ensures that a specific pump pressure of the flushing pump 7 is not exceeded. If the pump pressure of the flushing pump 7 is exceeded, the pressure-limiting valve 12 opens and conveys the pressure medium to the tank 9.

Two further pressure-limiting valves 13, 14 are provided to restrict the pressure in the working line 4, 5 under high pressure. If a predetermined high pressure is exceeded in working line 4 for example, pressure-limiting valve 13 opens so that volume flow can pass over from working line 4 directly into the second working line 5 in which a lower working pressure prevails. Since the hydraulic pump 2 is reversible, when the conditions are reversed, the pressure-limiting valve 14 and in this case a volume flow must lead into working line 4 which is operating as the low-pressure line.

Finally, the illustrated closed hydraulic circuit also comprises a flushing valve 15 which on the one hand is connected to the two working lines 4, 5, and the outlet connection 18 of which is connected on the other hand to the tank 9 by means of the interconnection of a pressure-limiting valve 16. In the illustrated position, the flushing valve 15 is held in the rest position by two centring springs. In this position, all connections of the flushing valve 15 are separated from one another. If the pressure in the first working line 4 exceeds the pressure in the second working line 5, the flushing valve 15 is deflected downwards against the lower spring tension in the image plane, of the centring spring. The flushing valve 15 is displaced in the direction of a first end position. In this end position, the removal line 17, connected to the other working line 5, is connected to the outlet connection 18. Pressure medium flows via the outlet connection 18 through the pressure-limiting valve 16 and then via a cooler 19 into the tank 9.

If the working pressure in the lower working line 5 in the image plane exceeds the working pressure in the upper working line 4, the flushing valve 15 switches into the opposite direction so that the removal line 20 is connected to the outlet connection 18 and accordingly a volume flow is directed out of the closed hydraulic circuit 1.

The pressure-limiting valve 16, connected to the outlet connection 18 of the flushing valve 15, is used to adjust a minimum pressure in the first or second working line 4, 5 which is respectively conducting the low pressure.

During normal operation, in the region of the pressure-limiting valve 16, energy which is not available as driving power for driving the hydraulic pump 2 is permanently dissipated. There are also leakage losses in the region of the hydraulic pump 2 and of the hydraulic motor 6. These leakage losses are also fed to the tank 9 by leakage lines 21.

Figure 2:
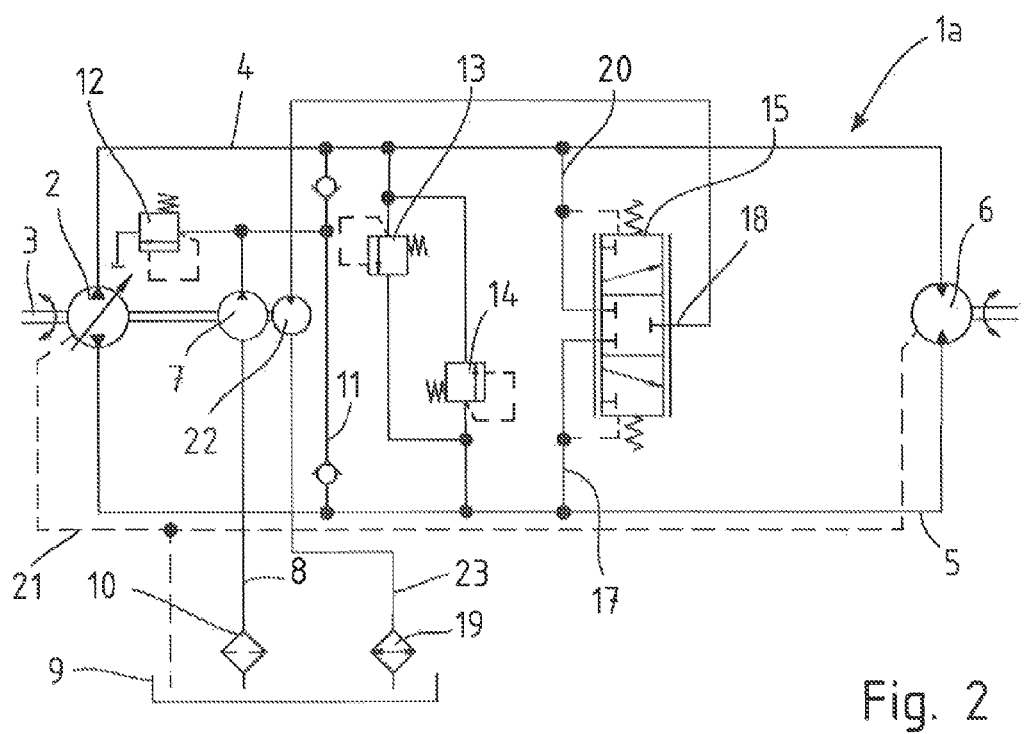
FIG. 2 shows a first embodiment of a closed hydraulic circuit comprising an additional hydraulic consumer.

FIG. 2 shows a first embodiment of the invention which differs from the prior art according to FIG. 1 in that the outlet connection 18 of the flushing valve 15 is connected to a hydraulic consumer 22 in the form of a hydraulic motor which is connected parallel to the drive of the flushing pump 7 of the closed hydraulic circuit. The hydraulic consumer 22, like the drive via the drive shaft 3, drives the flushing pump 7 so that less energy is required for operating the flushing pump or the hydraulic pump 2. In turn, the pressure medium which flows through the hydraulic consumer 22 is fed to the tank 9 by a discharge line 23.

Figure 3:
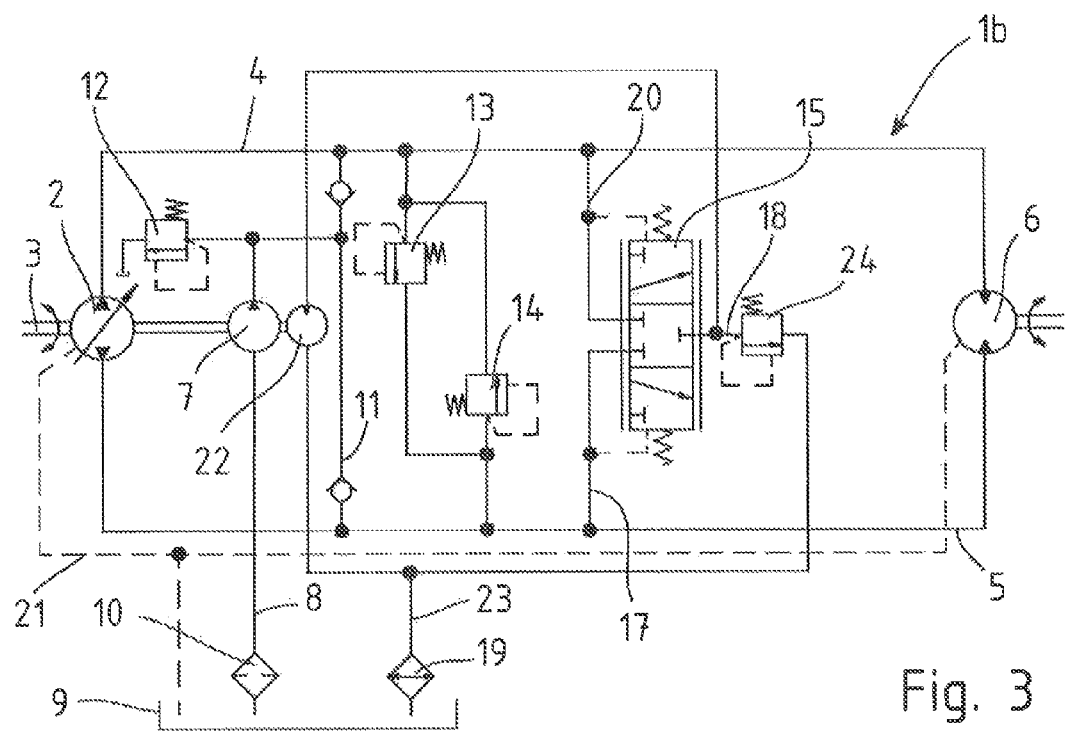
FIG. 3 shows a second embodiment of a closed hydraulic circuit comprising a pressure-limiting valve connected parallel to the hydraulic consumer.

The development according to the invention of FIG. 3 differs from that of FIG. 2 in that in addition to the hydraulic consumer 22, a pressure-limiting valve 24 is provided which is connected parallel to the hydraulic consumer 22. The pressure-limiting valve 24 which is also hydraulically connected to the outlet connection 18 of the flushing valve 15 is used to restrict pressure peaks in the low-pressure side of the hydraulic circuit 1b. Like the hydraulic consumer 22, the pressure-limiting valve 24 is connected to the discharge line 23 which discharges into tank 9 via the cooler 19. Reference is made to the descriptions in FIGS. 1 and 2 with regard to the further components.

Figure 4:
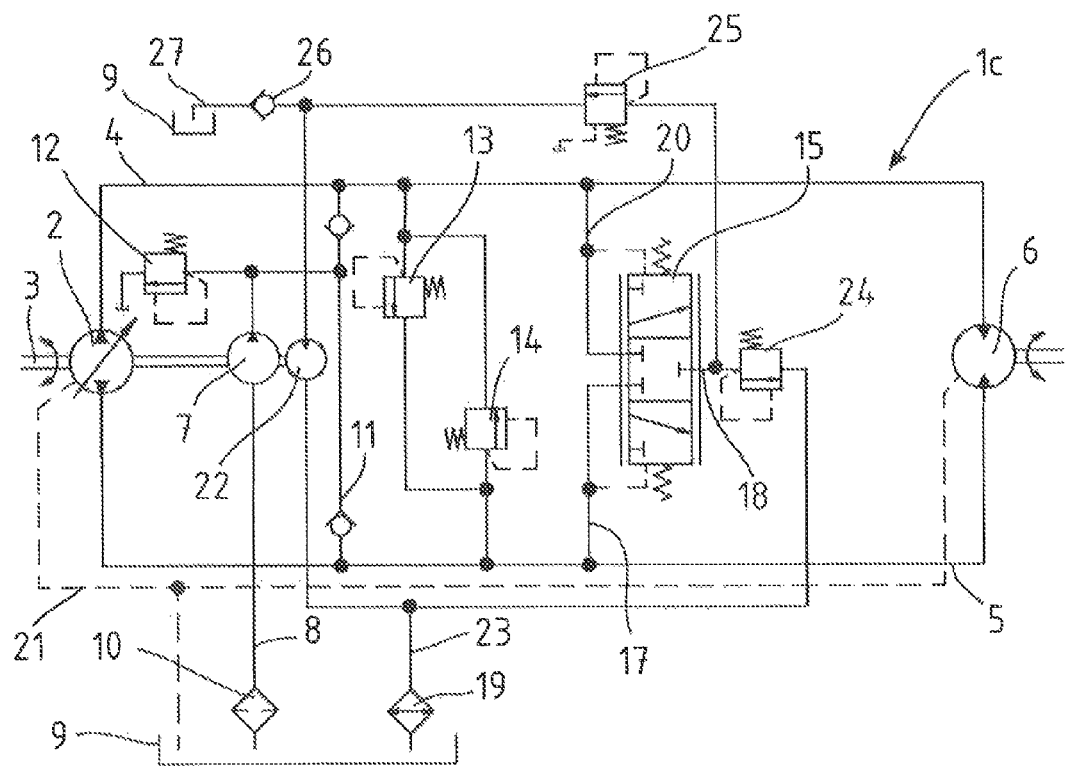
FIG. 4 shows a third embodiment of a closed hydraulic circuit comprising a pressure sequence valve.

The embodiment of FIG. 4 differs from that of FIG. 3 in that a pressure valve 25 is connected upstream of the hydraulic consumer 22 as a pressure sequence valve, which valve opens before a pressure adjusted at pressure valve 24 is exceeded. Consequently, the hydraulic consumer 22 is only provided with the pressure medium at a specific pressure, but also before the volume of pressure medium flows away via the pressure-limiting valve 24 connected downstream of the outlet connection 18 of the flushing valve 15. However, an operating state can result in which not enough pressure medium can be made available to the hydraulic consumer 22 via the pressure valve 25. For this purpose, a non-return valve 26 is connected to a suction line 27 which discharges into the tank 9. The pressure medium can be drawn up by suction from the tank 9 via the non-return valve 26, so that a trouble-free operation of the hydraulic consumer 22 is possible without recovering energy. In this arrangement, it is possible to deliberately dispense with energy recovery in the case of extreme operating parameters, to allow an even higher energy recovery in other frequent operating states.

A hydraulic consumer 22 in the form of a hydraulic motor with an adjustable displacement can be used, which motor is operated in pressure control and thus removes the appropriate pressure in the low-pressure line.

Advantageous uses of the illustrated circuits are hydrostatic drives, for example for slewing gear and winches, particularly in the case of mobile machines, namely diggers and cranes.

Figure 5:
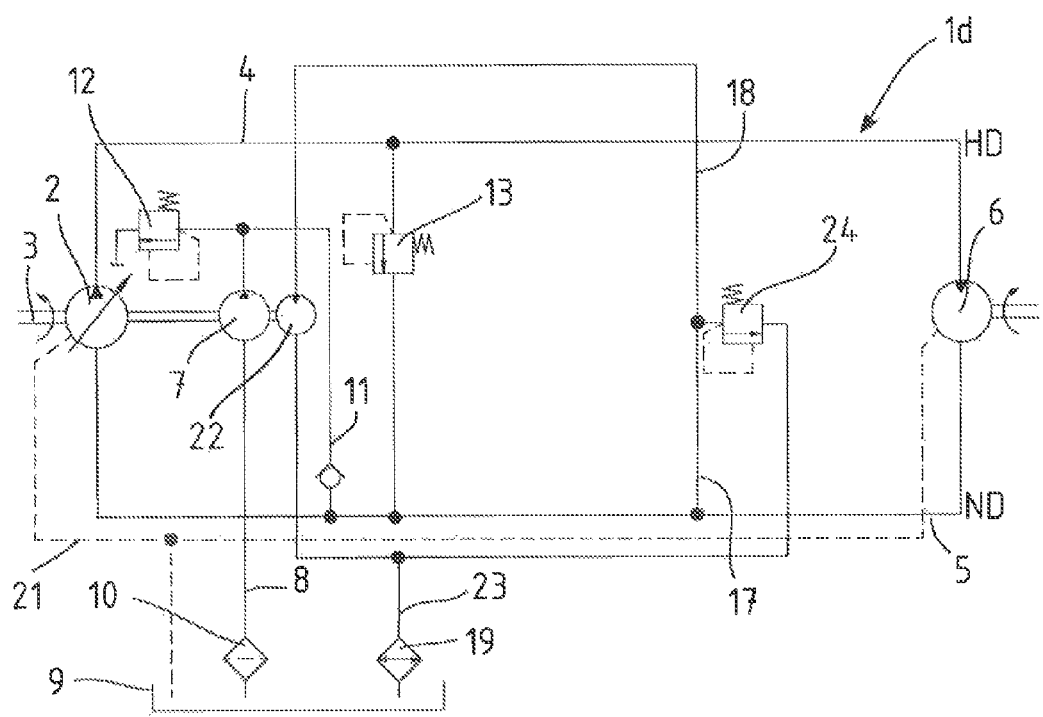
FIG. 5 shows a fourth embodiment of a closed hydraulic circuit comprising a fixed high-pressure side.

The embodiment of FIG. 5 differs from the preceding variants in that the high-pressure side HD and the low-pressure side ND are fixed. Consequently, the flushing valve 15, the non-return valve in the feed line 11 to the high-pressure side and also one of the pressure-limiting valves 14 are omitted. The mentioned reference signs relate to FIG. 3. Furthermore, the feed line denoted by reference sign 11 in FIG. 3 is now only connected to the low-pressure side, i.e. to working line 5. Otherwise, the construction of the circuit corresponds to that of FIG. 3 so that reference is made to the description provided therein.

The invention claimed is:

1. A closed hydraulic circuit between a hydraulic pump and a first hydraulic motor which are interconnected by working lines, comprising:
   a flushing pump being provided to feed pressure medium into the working lines;
   an outlet connection being provided to discharge excess pressure medium from the working lines;
   at least one hydraulic consumer being connected downstream of the outlet connection, the hydraulic consumer being provided to convert at least some of the volume flow discharged out of the hydraulic circuit into mechanical power;
   wherein:
   the hydraulic consumer is connected to a suction valve connected to at least one of a tank or a return line of an open hydraulic circuit; and
   the hydraulic consumer comprises a second hydraulic motor which is connected parallel to a drive of the flushing pump of the closed hydraulic circuit.

2. The closed hydraulic circuit according to claim 1, wherein the hydraulic consumer in the form of the second hydraulic motor comprises a fixed displacement motor having a fixed displacement.

3. The closed hydraulic circuit according to claim 1, wherein the hydraulic consumer in the form of the second hydraulic motor comprises an adjustable displacement and is operated in pressure control.

4. The closed hydraulic circuit according to claim 1, comprising a pressure-limiting valve connected in parallel to the at least one hydraulic consumer to prevent pressure peaks in the low-pressure side of the hydraulic circuit.

5. The closed hydraulic circuit according to claim 4, wherein the hydraulic consumer is connected to the outlet connection via a pressure valve which opens at a lower pressure than the pressure-limiting valve which is connected to the outlet connection and is connected to prevent pressure peaks in the low-pressure side of the hydraulic circuit.

6. The closed hydraulic circuit according to claim 1, wherein the outlet connection is connected to the outlet of a flushing valve which, in the case of circuits having an unfixed high-pressure and low-pressure side, is connected to both working lines on the inlet side.

* * * * *